United States Patent [19]

Robertson

[11] Patent Number: 4,510,854

[45] Date of Patent: Apr. 16, 1985

[54] COMPACT BARBECUE OVEN

[75] Inventor: Michael L. Robertson, Marion, Ill.

[73] Assignee: B. B. Robertson Company, Marion, Ill.

[21] Appl. No.: 488,180

[22] Filed: Apr. 25, 1983

[51] Int. Cl.³ .............................................. A47J 37/04
[52] U.S. Cl. ........................................ 99/337; 99/331;
99/341; 99/347; 99/352; 99/427; 99/447;
99/448; 99/475; 99/476; 99/479; 99/480;
99/481; 126/21 A; 126/287
[58] Field of Search ............... 99/444, 446, 427, 467,
99/474–477, 479, 331, 337, 341, 448, 480; 345,
347, 447, 481, 352, 421 HV; 126/338, 41 B, 287,
21 A

[56] References Cited

U.S. PATENT DOCUMENTS

| 928,695 | 7/1909 | Pinegar et al. | 99/474 X |
| 2,715,870 | 8/1955 | Rutkowski | 99/421 HV |
| 2,833,201 | 5/1958 | Simank | 126/21 A |
| 3,041,959 | 7/1962 | Oyler | 126/287 X |
| 3,397,632 | 8/1968 | Moler | 99/446 X |
| 3,568,590 | 3/1971 | Grice | 99/446 |
| 3,665,840 | 5/1972 | Horany | 99/479 |
| 3,792,654 | 2/1974 | Turner | 99/427 |
| 3,951,052 | 4/1976 | Ringo | 99/427 |
| 3,961,571 | 6/1976 | Decuir | 99/480 X |
| 4,300,523 | 11/1981 | Robertson et al. | 99/427 X |

Primary Examiner—Billy J. Wilhite
Attorney, Agent, or Firm—Gravely, Lieder & Woodruff

[57] ABSTRACT

A highly compact oven for preparing barbecued foods on a commercial basis includes a cabinet having a vertical partition wall that divides its interior into an oven chamber and an equipment compartment, and a door which closes the front of the oven chamber. In addition, the oven has a rotisserie for supporting foods in the upper portion of the oven chamber, and this rotisserie is turned by a motor in the equipment compartment. A firebox in which wood is burned is located in the lower portion of the oven chamber to provide the heat required for cooking the food and the smoke for imparting the barbecue flavor to that food. Food on the rotisserie is shielded from the firebox by a baffle wall which extends across the oven chamber, yet has its margins spaced from the back wall and door, so that heated air and smoke circulate freely between the region of the firebox and the region of the rotisserie. Moreover, the firebox is exposed to the oven chamber at every surface on the firebox, so that maximum transfer of heat to the circulating air occurs. Wood that is placed within the firebox is ignited by a burner that is located in the equipment compartment, but projects its flame through a sleeve that extends between the firebox and the vertical partition wall.

15 Claims, 3 Drawing Figures

COMPACT BARBECUE OVEN

BACKGROUND OF THE INVENTION

This invention relates in general to ovens for cooking food, and more particularly to a compact barbecue oven.

Barbecued foods have traditionally been prepared over open fires, and while this procedure may be acceptable for an occasional back yard barbecue, it is not suitable for the preparation of barbecued foods on a large scale commercial basis. Indeed, open fires are most inefficient, and require an exceptionally large surface area to cook foods in even reasonable quantities. Many restaurants that specialize in barbecue foods utilize commercial barbecue ovens for preparing their foods. These ovens often contain a rotisserie for supporting a large quantity of food in a relatively confined space, and have some type of firebox or burner arrangement. Indeed, the true barbecue flavor can only be obtained when a wood-burning firebox is employed, and in some of these ovens the firebox is located in the actual oven chamber, while in others the firebox is located remote from the oven chamber. In either case, the oven occupies a considerable amount of floor space and may not be suitable for restaurants that do relatively modest business in barbecue foods. Furthermore, many barbecue ovens of current manufacture derive most of their heat from expensive fuels such as natural or liquid petroleum gas or from other energy sources such as electricity.

SUMMARY OF THE INVENTION

One of the principal objects of the present invention is to provide a barbecue oven that is highly compact and occupies relatively little floor space. Another object is to provide a barbecue oven that contains within its oven chamber a firebox in which wood may be burned to provide the food as it is cooked with the true barbecue flavor. A further object is to provide a barbecue oven which enables smoke to accumulate in the region where the food is supported within the oven. An additional object is to provide an oven of the type stated in which the smoke that accumulates within the oven is quickly vented when access to the food is desired so that the smoke does not become oppressive in the room in which the oven is located. Still another object is to provide a barbecue oven of the type stated that is simple in construction and inexpensive to manufacture. These and other objects and advantages will become apparent hereinafter.

DESCRIPTION OF THE DRAWINGS

In the accompanying drawings which form part of the specification and wherein like numerals and letters refer to like parts wherever they occur

DETAILED DESCRIPTION

Figure 1:
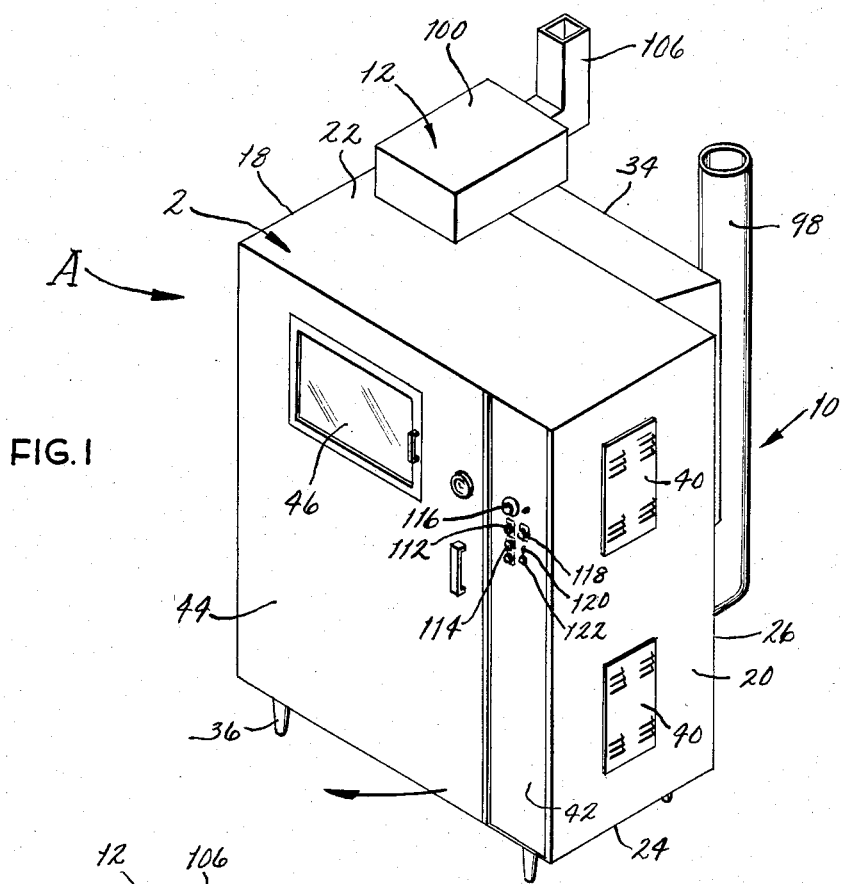
FIG. 1 is a perspective view of a compact barbecue oven constructed in accordance with and embodying the present invention.

Referring now to the drawings, a highly compact barbecue oven A includes a cabinet 2 that houses or otherwise supports all of the major components of the oven A. Among those components are a rotisserie 4 located in the upper portion of the cabinet 2, a firebox 6 located in the lower portion of the cabinet 2, a burner 8 positioned to direct a flame into the firebox 6, a flue 10 extended up the back of the cabinet 2, and an exhaust unit 12 mounted on top of the cabinet 2.

The cabinet 2 itself includes left and right side walls 18 and 20, a top wall 22, a bottom wall 24, and a back wall 26 all of which are united in a rigid box-like structure. In addition, the cabinet 2 has a vertical partition wall 28 (FIG. 2) which extends from the top wall 22 to the bottom wall 24 and divides the interior of the cabinet 2 into an oven chamber 30 and an equipment compartment 32, the former being considerably larger than the latter. The partition wall 28 is attached to the top wall 22, the bottom wall 24 and the back wall 26 and extends forwardly to the forward margins of the top and bottom walls 22 and 24. Each of the walls 18, 20, 22, 24, 26, and 28 is composed of spaced apart sheets of metal, preferably stainless steel, and a thermal insulating material between the two sheets. While the side walls 18 and 20 and the top and bottom walls 22 and 24 are flat, the back wall 26 at the upper portion of the oven chamber 30 bulges rearwardly at an offset 34 (FIG. 3), so that the upper portion of the oven chamber 30 is somewhat deeper than the lower portion. The entire cabinet 2 rests on short legs 36 which extend downwardly from the bottom wall 24. The right side wall 20 contains two relatively large access openings 38 (FIG. 2), one being located near the top wall 22 and the other near the bottom wall 24. The upper opening 38 affords access to the rotisserie motor 56 and transmission 54 and a part of the rotisserie 4, while the lower opening affords access to the burner 8. Each of the openings 38 is covered by a door 40 that contains ventilating louvers to enable air to circulate through the equipment compartment 32.

The front of the equipment compartment 32 is closed by a front panel 42 that attaches to the right side wall 20, the top wall 22, the bottom wall 24 and the partition wall 28. The front of the oven chamber 30, on the other hand, is normally closed by a main door 44 that is attached to the left side wall 18 by hinges and to the partition wall 28 through a catch. The main door 44 contains a glass access door 46 which is located opposite to the rotisserie 4 so that food on the rotisserie 4 may be observed without opening the main door 44. Moreover, the access door 46 is attached to the main door 44 through hinges so that it may be opened to place individual items of food on or remove them from the rotisserie 4.

Finally, the cabinet 2 has a baffle wall 48 (FIG. 3) that extends between the left side wall 18 and the vertical partition wall 28 and separates the oven chamber 30 into upper and lower portions. Indeed, the baffle wall 48 is located immediately below the offset 34 in the back wall 26, so that it is in that part of the oven chamber 30 having lesser depth. The baffle wall 48 is located between the rotisserie 4 and the firebox 6 and shields the food that is on the former from the latter. Even so, the baffle wall 48 is spaced from the back wall 26 and from the main door 44, so that air and smoke will circulate freely between the upper and lower portions of the oven chamber 30. Like the other walls of the cabinet 2, the baffle wall 48 consists of spaced apart sheets of stainless steel which may contain a thermal insulating material in the space between them. The baffle wall 48 slopes downwardly toward the back wall 26, so that juices from food on the rotisserie will not accumulate on it, but instead will drain toward the back wall 26.

Figure 2:
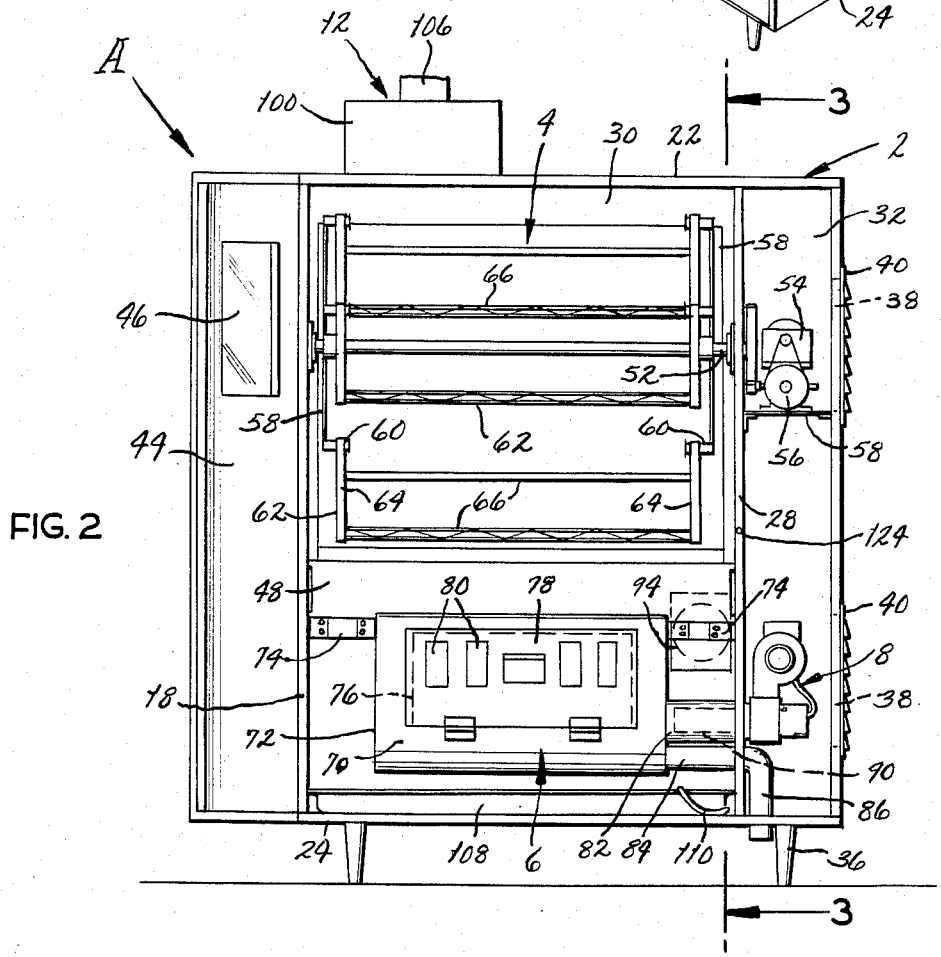
FIG. 2 is a front elevational view of the oven with the main door of the oven being open and the adjacent front panel removed.

The rotisserie 4 includes an axle 52 that revolves in bearings mounted on the left side wall 18 and the vertical partition wall 28, and indeed the axle 52 extends through the partition wall 28 where it is connected through a transmission 54 (FIG. 2) to an electric motor 56. Both the transmission 54 and the motor 56 are mounted on a plate 58 that extends through the equipment compartment immediately below the upper opening 38 in the right side wall 20, so that the transmission 54 and motor 56 may be serviced through that opening. Within the oven chamber 30, the axle 52 has two end frames 58 mounted firmly on it, these frames being of polygonal shape (FIG. 3), and at their apexes the frames 58 are provided with inwardly directed trunnions 60 (FIG. 2). The trunnions 60 on one frame 58 align with the trunnions 60 on the other frame 58, and supported on each set of aligned trunnions 60 is a tray 62. Actually, the trays 62 are suspended from the trunnions 60, each tray having at their ends triangular brackets 64 which loop over aligned trunnions 60 on the two end frames 58. Each tray 62 also has a pair of decks 66 that extend between its bracket 64 such that one is above the other. Thus, as the axle 52 turns, the trays 62 follow a circular path in the oven chamber 30, and that path passes by the glass access door 46, so that the trays 62 move past the access door 46 one after the other.

Figure 3:
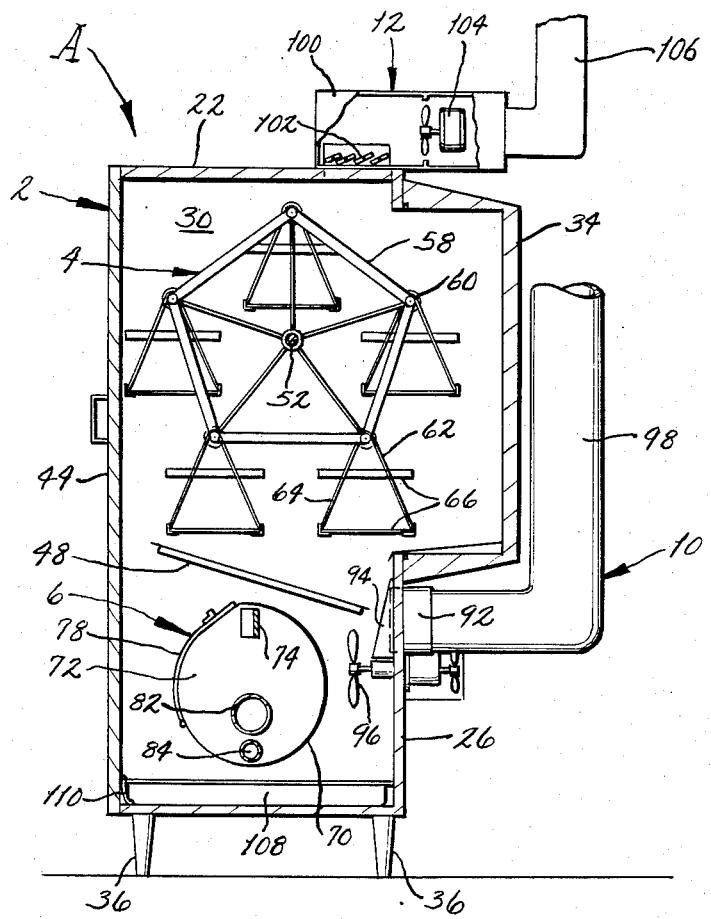
FIG. 3 is a sectional view of the oven taken along line 3—3 of FIG. 2.

The firebox 6 has a drum-like configuration and as such includes a cylindrical longitudinal or side wall 70 and circular end walls 72 (FIGS. 2 and 3). It is attached to the left side wall 18 and vertical partition wall 28 of the cabinet 2 by hangers 74 which extend between its circular end walls 72 and the cabinet walls 18 and 28. The positioning of the firebox 6 is such that the axis of the cylindrical wall 70 is horizontal, yet that wall is spaced from both the baffle wall 48 and the bottom wall 24 as well as from the back wall 26 and the door 44 of the cabinet 2, while the respective end walls 72 are spaced from the left side wall 18 and the partition wall 28. Thus, air and smoke within the oven chamber 30 circulate freely along all walls 70 and 72 of the firebox 6. The cylindrical wall 70 contains an opening 76 that is presented forwardly, that is toward the main door 44, and upwardly, but this opening is normally closed by an arcuate door 78 that is hinged to the cylindrical wall 72 along the bottom margin of the opening 76. Thus, the door 78 may be pulled forwardly and allowed to drop downwardly, and when so disposed logs or wood in some other form may be placed in the firebox 6 through the opening 76. The door 78 in turn is provided with one or more apertures 80 which open upwardly and slightly forwardly so as to allow smoke that is generated within the firebox 6 to escape into the oven chamber 30.

In addition, the firebox 6 has a sleeve 82 which projects axially from the circular end wall 72 toward the vertical partition wall 28 which it abuts along its end face. One end of the sleeve 82 opens into the firebox 6 below its center, while the other end opens into the equipment compartment 32 through the vertical partition wall 28.

Immediately below the sleeve 82 the firebox 6 is provided with a vent tube 84 which extends axially to the vertical partition wall 28 and here it couples with a continuation 86 which extends downwardly through the equipment compartment 32 and likewise through the bottom wall 24. The vent tube 84 and its continuation 86 permit combustion air to enter the firebox 6 to support the combustion of logs or other wood in the firebox 6.

The wood placed in the firebox 6 and consumed there constitutes the primary source of heat for cooking food in the oven chamber 30, but the burner 8 supplements this source and further provides a means for igniting the wood. The burner 8 is located within the equipment compartment 32 (FIG. 2) opposite the lower door 40 of that compartment, so that it can be serviced through the lower opening 38 in the right side wall 20. It may be a conventional conversion burner of the type used to convert coal-fired or oil-fired furnaces to gas operation, and as typical of such burners it includes a blast tube 90. Indeed, the burner 8 is mounted such that its blast tube 90 projects into the sleeve 82 of the firebox 6. In operation, the burner 8 introduces a combustible mixture of gas and air into the firebox 6, and that mixture upon being ignited burns within the firebox 6.

The flue 10 opens into the oven chamber 30 through a sleeve 92 (FIG. 3) that is located in the back wall 26 slightly below offset 34 therein. Indeed, the sleeve 92 is located directly opposite the lower margin of the baffle wall 48. The disposition of the sleeve 92 in the back wall 26 insures that the smoke and air which are discharged from the oven chamber 30 are drawn from the rear of that chamber, and to further insure that those gases come from lower portion of the chamber 30, the sleeve 92 over its front end is fitted with a baffle 94 that opens only downwardly. Finally, the sleeve 92 is offset laterally with respect to the firebox 6, it being located adjacent to the vertical partition wall 28. The positioning of flue sleeve 92 and its baffle 94 together with the position of the baffle wall 48 and the firebox 6 and its apertures 80 are all such that smoke upon being discharged from the apertures 80 of the firebox 6 rises past the front margin of the baffle wall 48 to then circulate around the food on the trays 62 of the rotisserie 4. Some of the smoke thereafter passes downwardly past the rear margin of the baffle wall 48, and finally passes beneath the downwardly presented lip of the flue baffle 94 where it enters the flue 10. To facilitate this pattern of circulation, the back wall 26 of the cabinet 2 is, immediately below the lower margin of the baffle wall 48, fitted with a fan 96 which is directed at the back of the firebox 6 and is further centered with respect to the firebox 6. The smoke and air which does not escape through the flue 10, and that constitutes most of the smoke and air in the chamber 30, is forced by the fan 96 past the firebox 6 where it is reheated. Completing the flue 10 is a flue pipe 98 which attaches at its lower end to the sleeve 92 and beyond the sleeve 92 extends upwardly along the back wall 26 of the cabinet 2. The pipe 98 terminates at the exterior of the building in which the oven A is located.

The exhaust unit 12 is supported on the upper wall 22 of the cabinet 2 and includes a housing 100 (FIG. 3), an electrically operated damper 102 which normally seals the interior of the housing 100 from the oven chamber 30, but when opened vents the oven chamber 30 into the housing 100. The housing 100 also contains a fan 104 which when energized draws smoke and air out of the oven chamber 30 and forces it through a stack 106, assuming of course that the damper 102 is open. The stack 106, like the flue pipe 98, terminates at the exterior of the building where the oven A is located.

The bottom wall 24 of the cabinet 2 supports a pan 108 that occupies the entire bottom of the oven chamber 32, and this pan catches juices which drip primarily from the rear margin of the baffle wall 48. However, some juices fall onto the lower surface of the offset 34 in the back wall 26, and this surface is inclined downwardly, so that the juices do not collect upon it, but instead flow downwardly and drop into the pan 108. In this connection, the lower surface terminates at a lip which projects slightly forwardly from the lower portion of the back wall 26 so that the juices do not run down the back wall 26. The pan 108 has a silicone rubber hose 110 attached to its lowermost portion, and normally the free end of the hose 110 is hooked over the upper margin of the pan 108 so that the juices remain in the pan 108. However, to drain the pan 108, the free end of the hose 110 is merely unhooked and directed into a receptacle of some type.

The oven A has various controls for coordinating the operation of the rotisserie 4, the burner 8, the exhaust unit 12, and the circulating fan 96, and some of these controls are located on the front panel 42 where they are readily excessible (FIG. 1). Among the controls on the front panel 42 are a rotisserie advance switch 112 which when closed energizes the motor 56 for the rotisserie 4 even when the main door 44 is open, and this of course enables each tray 62 to be brought to a position where food may be conveniently placed on or removed from it. In addition, there is a light switch 114 which operates lights that illuminate the oven chamber 30. The front panel 42 also holds a circuit breaker 116 which is in series with the motor 56 of the rotisserie 4 and protects that motor in the event that the rotisserie 4 jams. The panel 42 also contains a rotisserie control switch 118 which when closed with the main door 44 closed energizes both the rotisserie 4 and the circulating fan 96. There is, in addition, a burner switch 120 which is of the thermostatic variety in that it can be set to close at a desired temperature. The switch 120 senses the temperature in the upper portion of the oven chamber 30, and when that temperature falls to the temperature to which the switch 120 is set, the switch energizes the burner 8 so that it supplies additional heat to the firebox 6 and oven chamber 30, and by the same token when the temperature in the upper portion of the oven chamber 30 reaches a predetermined temperature, the switch 120 de-energizes the burner 8. Finally, the front panel 42 contains a smoke extractor switch 122 which, when closed, causes the damper 102 to open and energizes the fan 104 of the exhaust unit 12. As a result, smoke and air are exhausted from the oven chamber 30. The air and smoke that passes outwardly through the damper 102, the exhaust fan 104 and the stack 106 is replaced by fresh air which flows in through the flue 10. The smoke extractor switch 122 also de-energizes the burner 8 should it be in operation at the time the switch 122 is closed.

Finally, the control system includes another switch 124 (FIG. 2) which is operated by the main door 44 and functions much like the smoke extractor switch 122. In particular, when the main door 44 is opened, the switch 124 opens the damper 102, energizes the exhaust fan 104 and deactivates the burner 8 and circulating fan 96.

To prepare the barbecue oven A for operation, the main door 44 is opened and the door 78 of the firebox 6 is swung forwardly and downwardly to expose the interior of the firebox 6. Wood suitable for producing a desired barbecue flavor is then placed into the firebox 6, and perhaps the best wood for this purpose is hickory in the form of reasonably dry logs. Once the firebox 6 contains a moderate supply of wood, the firebox door 78 is closed. Also, food which is to be barbecued is loaded onto the trays 62 of the rotisserie 4. In this regard, each tray contains two decks 66, so that a suitable amount of food may be placed in the oven A for cooking. Then the main door 44 is closed, and the temperature desired for cooking is set on the thermostatic burner switch 120. Since the temperature of the oven chamber 30 is initially below the setting of the burner switch 120, the burner 8 is energized, and it mixes a combustible gas with air, discharging that mixture from its blast tube 90 where the mixture is ignited by an electrical igniting element which also forms part of the burner 8. The resulting flame begins near the entrance of the sleeve 92 into the interior of the firebox 6, and this flame impinges against the wood in the firebox 6, causing it to ignite and produce a suitable amount of smoke. The smoke escapes through the apertures 80 of the firebox door 78, and along with air in the chamber flows upwardly past the front margin of the baffle wall 48. The air and smoke circulate around the rotisserie 4 in the upper portion of the oven chamber 30. Some of the smoke and air flows downwardly past the lower and rear margin of the baffle wall 48 where the circulating fan 96 directs it against the firebox 6, causing smoke and air to circulate both over and under as well as to the sides of the firebox 6. A small amount of smoke and air enters the flue 10 at the baffle wall 48 and is discharged into the atmosphere through the flue 10.

The burning wood within the firebox 6 heats the walls of the firebox 6, and this heat is transferred to the air which flows around the firebox 6, so that the temperature of the air is elevated substantially. This is the air that flows upwardly and circulates around the rotisserie 4, thereby cooking the food on the rotisserie 4. The air necessary for supporting combustion flows into the firebox 6 through the sleeve 82 as well as through the vent tube 84 located below the sleeve 82.

The cylindrical side wall 70 of the firebox 6 becomes extremely hot, but the baffle wall 48 shields the rotisserie 4 from this wall and thereby prevents heated air from rising directly through the rotisserie 4 and the food supported on it. On the contrary, the air passes upwardly along the main door 44 of the cabinet 2 and then circulates through the food on the rotisserie 4, thereby providing a more even distribution of heat to the food on the rotisserie 4.

Within a short time, the flame produced by the burning wood sustains itself, and indeed the wood provides enough heat to maintain a desired cooking temperature without the supplemental heat produced by the burner 8. At this time, the thermostatic burner switch 120 shuts the burner 8 off, and the oven temperature is maintained solely by the burning wood. Should the temperature of the oven chamber 30 drop below the setting on the thermostatic switch 120, the burner 8 will come on and supply enough heat to raise the temperature to the setting of the switch 120. The burner 8, when again activated, further tends to rekindle the wood within the firebox 6. However, tests have shown that very little additional heat is required if the main door 44 is maintained closed, so that the burner 8 is called upon only occasionally for supplemental heat.

As the cooking proceeds, the food releases juices which to a large measure fall onto the food on the underlying trays 62. In this sense, the oven A promotes self-basting of the foods. Any juices not caught on the food drop onto the lower surface of the offset 34 in the back wall 26 or on the baffle wall 48. These surfaces in turn drain toward the pan 108 where the juices collect. This pan 108 is drained from time to time by detaching the free end of its hose 110 and directing it into a suitable receptacle.

Foods may be removed from or placed on the trays 62 of the rotisserie 4 by opening the glass access door 46 in the main door 44 of the cabinet 2. However, if a large amount of food is to be loaded or unloaded, it is preferable to open the main door 44. When this occurs, the rotisserie 4 will stop, the circulating fan will stop, and the burner 8 will de-energize. Moreover, the damper 102 of the exhaust unit 12 will open and the fan 104 will be energized. The fan 104 draws smoke and hot air out of the oven chamber 30 and discharges it into the atmosphere without allowing much of it to escape into the room in which the oven A is located. Even less smoke escapes if the smoke extractor switch 122 is closed before the main door 44 is opened.

This invention is intended to cover all changes and modifications of the example of the invention herein chosen for purposes of the disclosure which do not constitute departures from the spirit and scope of the invention.

What is claimed is:

1. A barbecue oven comprising: a cabinet having walls and a door all provided with surfaces which enclose an oven chamber, some of the enclosing surfaces being upright and one of the upright surfaces being on the door; support means for supporting food in an upper portion of the oven chamber, the support means being accessible when the cabinet door is open, so that food may be loaded onto or removed from the support means; a firebox located in a lower portion of the oven chamber generally directly below the support means and also being accessible when the cabinet door is open, the firebox having at least one longitudinal wall and two end walls and a door that together enclose a space in which a fire is contained, the firebox door being in the longitudinal wall and being accessible when the cabinet door is open so that a solid fuel may be loaded into the firebox, the firebox containing apertures which open into the oven chamber to enable smoke to pass from the firebox to the oven chamber, the firebox having its longitudinal and both of its end walls and its door spaced from all of the cabinet walls and from the cabinet door such that air and smoke within the oven chamber may circulate past sides, ends, top, and bottom of the firebox, the firebox further having a sleeve which extends to one of the cabinet walls, the combustion which occurs in the firebox being the sole source of heat for the oven chamber; a burner mounted on the cabinet and being aligned with and extended into the sleeve on the firebox, the burner being capable of producing a flame which passes into the interior of the firebox to impinge on solid fuel in the firebox; and a baffle wall located in the oven chamber between the support means and the firebox such that it shields food that is on the support means from the firebox, the baffle wall extending only partially across the oven chamber and being spaced from opposite upright surfaces of the oven chamber so that air and smoke may circulate between the upper and lower portions of the oven chamber; and a fan located in the oven chamber for moving air and smoke between the upper and lower portions of the oven chamber and past the baffle wall as it does and for further causing air and smoke to circulate past the firebox.

2. The oven according to claim 1 wherein the cabinet includes a back wall that is spaced from the door; and wherein the baffle wall is spaced from both the door and the back wall so that smoke and heated air can circulate past both the front and rear margins of the baffle wall.

3. The oven according to claim 1 wherein the longitudinal wall of the firebox is generally cylindrical and the end walls, flat, the firebox being mounted with the axis of its cylindrical wall being generally horizontal.

4. The oven according to claim 3 wherein the door of the firebox is in the cylindrical side wall of the firebox.

5. The oven according to claim 4 wherein the door of the firebox opens generally upwardly and forwardly toward the door of the cabinet and includes one or more apertures for permitting smoke in the firebox to escape into the oven chamber.

6. The oven according to claim 5 wherein the cabinet includes a vertical partition wall that divides the interior of the cabinet into the oven chamber and an equipment compartment; and wherein the burner is mounted in the equipment compartment and the sleeve of the firebox extends between one end wall of the firebox and the vertical partition wall.

7. The oven according to claim 6 wherein the baffle wall is attached to the partition wall.

8. The oven according to claim 6 wherein the support means includes a rotisserie that revolves on an axle that extends horizontally through the oven chamber and is mounted at one end on the partition wall, and a motor for turning the axle, the motor being located in the equipment compartment.

9. The oven according to claim 1 and further comprising a flue that opens into the oven chamber in the region of the baffle wall.

10. The oven according to claim 1 and further comprising an exhaust unit that communicates with the oven chamber at the top of the oven chamber, the exhaust unit including a damper that normally seals the top of the oven chamber and a fan located beyond the damper.

11. The oven according to claim 10 and further comprising means for opening the damper and energizing the fan of the exhaust unit when the door of the cabinet is opened or when a smoke extractor switch is closed.

12. A barbecue oven comprising: a cabinet having spaced apart side walls, top and bottom walls, a back wall, a partition wall which is disposed intermediate the side walls and divides the cabinet into an oven chamber and an equipment compartment, and a door which is hinged to one of the side walls and when closed extends across and closes the front of the oven chamber; support means mounted on the cabinet in an upper portion of the oven chamber for supporting food in the oven chamber; a firebox mounted in a lower portion of the oven chamber and having at least one longitudinal wall and two end walls and a door that totally enclose a space in which a fire is contained, the firebox walls being spaced from the walls and door of the cabinet so that air within the oven chamber will circulate freely around substantially the entire firebox, the firebox door being in the longitudinal wall and being accessible when the cabinet door is open and when open exposing the interior of the firebox so that wood can be loaded into the firebox, the firebox also having apertures which open into the oven chamber so that smoke may escape from the firebox into the oven chamber, the firebox further having a sleeve extended between one of the firebox walls and the vertical partition wall, the combustion which occurs in the firebox being the sole source of heat for the oven chamber; a burner located in the equipment compartment and being adapted to produce a flame that discharges into the firebox from the sleeve; a baffle wall located between the support means and the firebox and being extended between and attached to the partition wall and the cabinet side wall that form the sides of the oven chamber, the baffle wall being spaced from the cabinet back wall and from the cabinet door so that air and smoke will circulate between the upper and lower portions of the oven chamber; and a fan mounted on the cabinet and located in the oven chamber for enhancing the circulation of air and smoke around the firebox and between the upper and lower portions of the oven chamber.

13. The oven according to claim 12 and further comprising an exhaust unit that communicates with the oven chamber at an upper end thereof, the exhaust unit including a damper which is normally closed so as to prevent heated air and smoke from escaping through the exhaust unit and a fan located beyond the damper for withdrawing heated air and smoke from the oven chamber when the damper is open.

14. The oven according to claim 12 and further comprising a flue that opens into the oven chamber below the support means.

15. The oven according to claim 12 wherein the support means is a rotisserie including an axle that is supported on one of the side walls and the partition wall and a motor that is mounted in the equipment compartment and is coupled to the axle for turning the axle.

* * * * *

UNITED STATES PATENT AND TRADEMARK OFFICE
CERTIFICATE OF CORRECTION

PATENT NO. : 4,510,854
DATED : April 16, 1985
INVENTOR(S) : Michael L. Robertson It is certified that error appears in the above-identified patent and that said Letters Patent are hereby corrected as shown below:

Column 4, line 35, "position" should be "positioning".

Column 8, Claim 11, line 4, "or when a smoke extractor switch is closed" should be deleted.

Signed and Sealed this

Sixth Day of August 1985

[SEAL]

Attest:

DONALD J. QUIGG

Attesting Officer   Acting Commissioner of Patents and Trademarks